(12) United States Patent
Szymczyk et al.

(10) Patent No.: US 12,143,888 B2
(45) Date of Patent: *Nov. 12, 2024

(54) SYSTEM AND METHOD OF PROVIDING AUGMENTED REALITY CONTENT IN SYNCHRONIZED DYNAMIC GEOLOCATION AREAS

(71) Applicant: Garpie, Inc., Manhattan Beach, CA (US)

(72) Inventors: Matthew Szymczyk, Manhattan Beach, CA (US); Alex Goldberg, Thousand Oaks, CA (US); Anatolij Dalekorej, Uzhhorod (UA); Andrii Tkachuk, Stryi (UA)

(73) Assignee: Garpie, Inc., Manhattan Beach, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/851,254

(22) Filed: Jun. 28, 2022

(65) Prior Publication Data

US 2022/0329967 A1    Oct. 13, 2022

Related U.S. Application Data

(63) Continuation of application No. 17/032,134, filed on Sep. 25, 2020, now Pat. No. 11,381,930, which is a (Continued)

(51) Int. Cl.
*H04W 4/021* (2018.01)
*G06T 19/00* (2011.01)
*H04W 4/02* (2018.01)

(52) U.S. Cl.
CPC .......... *H04W 4/022* (2013.01); *G06T 19/006* (2013.01); *H04W 4/025* (2013.01)

(58) Field of Classification Search
CPC ......... H04M 1/72448; H04M 3/42178; H04M 1/72403; H04M 2203/252;
(Continued)

(56) References Cited

U.S. PATENT DOCUMENTS 6,215,993 B1   4/2001  Ulveland
9,245,241 B2   1/2016  Kite
(Continued)

*Primary Examiner* — David Q Nguyen
(74) *Attorney, Agent, or Firm* — Sheppard Mullin Richter & Hampton LLP

(57) ABSTRACT

A system and method for creating a synchronized dynamic geolocation area and augmenting a view of the synchronized dynamic geolocation area with content based on one or more display parameters may be provided. An initiating user may generate a dynamic geolocation area that may track the location of the initiating user as the initiating user moves, and indicate content to associate with the geolocation area and one or more display parameters to associate with the content. A recipient user may be provided with an augmented view of the geolocation area based on the content and the display parameters. Further, a location of the recipient user may be synchronized with the geolocation area, such that as the recipient user or the geolocation area move, the augmented view may be modified to account for the movement.

14 Claims, 5 Drawing Sheets

Related U.S. Application Data continuation of application No. 16/842,121, filed on Apr. 7, 2020, now Pat. No. 10,798,521, which is a continuation of application No. 16/511,846, filed on Jul. 15, 2019, now Pat. No. 10,631,122, which is a continuation of application No. 15/843,479, filed on Dec. 15, 2017, now Pat. No. 10,356,551.

(60) Provisional application No. 62/435,176, filed on Dec. 16, 2016.

(58) Field of Classification Search
CPC ......... H04M 2250/52; H04M 1/27475; H04M 2207/18; H04M 7/006; H04M 1/72469; H04M 2250/64; H04W 4/02; H04W 4/029; H04W 4/70; H04L 67/52; H04L 51/222; H04L 51/063; H04L 51/52; G06Q 50/01
USPC .................. 455/456.1, 456.3, 415; 709/223
See application file for complete search history.

(56) References Cited

U.S. PATENT DOCUMENTS

| | | | |
|---|---|---|---|
| 9,270,818 B1 | 2/2016 | Nelissen | |
| 10,038,781 B2 | 7/2018 | Ali | |
| 10,185,719 B2 | 1/2019 | Yang | |
| 10,523,616 B2* | 12/2019 | Hong | .................... H04W 4/029 |
| 10,559,136 B2 | 2/2020 | Daniels | |
| 10,602,057 B1* | 3/2020 | Sehn | ....................... H04N 23/61 |
| 10,631,122 B2 | 4/2020 | Szymczyk | |
| 2008/0170679 A1 | 7/2008 | Sheha | |
| 2011/0293082 A1 | 12/2011 | Gauri | |
| 2012/0095979 A1 | 4/2012 | Aftab | |
| 2012/0143496 A1 | 6/2012 | Chitre | |
| 2012/0196581 A1 | 8/2012 | Papakipos | |
| 2012/0236104 A1 | 9/2012 | Fang | |
| 2012/0262532 A1 | 10/2012 | Poon | |
| 2012/0302256 A1 | 11/2012 | Pai | |
| 2013/0040730 A1 | 2/2013 | Barclay | |
| 2013/0297206 A1 | 11/2013 | Heng | |
| 2014/0119523 A1 | 5/2014 | Ray | |
| 2015/0128020 A1* | 5/2015 | Chavez | ................. G06F 40/169 |
| | | | 715/230 |
| 2015/0141060 A1* | 5/2015 | Shan | ....................... H04W 4/21 |
| | | | 455/566 |
| 2015/0156267 A1 | 6/2015 | Zhang | |
| 2015/0172395 A1* | 6/2015 | Jackson | ................. H04L 67/10 |
| | | | 709/204 |
| 2016/0034042 A1 | 2/2016 | Joo | |
| 2016/0366269 A1* | 12/2016 | Mansour | ........... H04M 1/72448 |
| 2017/0048686 A1 | 2/2017 | Chang | |
| 2017/0268886 A1 | 9/2017 | Tang | |
| 2017/0277191 A1 | 9/2017 | Fairfield | |
| 2017/0311367 A1 | 10/2017 | Ursitti | |
| 2018/0033208 A1 | 2/2018 | Martin | |
| 2019/0278093 A1 | 9/2019 | Osterhout | |
| 2020/0245122 A1 | 7/2020 | Beyer, Jr. | |
| 2021/0160657 A1 | 5/2021 | Shingler | |

* cited by examiner

SYSTEM AND METHOD OF PROVIDING AUGMENTED REALITY CONTENT IN SYNCHRONIZED DYNAMIC GEOLOCATION AREAS

CROSS-REFERENCE TO RELATED APPLICATIONS

This application is a continuation of U.S. patent application Ser. No. 17/032,134, filed Sep. 25, 2020, entitled "SYSTEM AND METHOD OF PROVIDING AUGMENTED REALITY CONTENT IN SYNCHRONIZED DYNAMIC GEOLOCATION AREAS", which is a continuation of U.S. patent application Ser. No. 16/842,121, filed Apr. 7, 2020, entitled "SYSTEM AND METHOD OF PROVIDING AUGMENTED REALITY CONTENT IN SYNCHRONIZED DYNAMIC GEOLOCATION AREAS" (which issued as U.S. Pat. No. 10,798,521 on Oct. 6, 2020), which is a continuation of U.S. patent application Ser. No. 16/511,846, filed Jul. 15, 2019, entitled "SYSTEM AND METHOD OF PROVIDING AUGMENTED REALITY CONTENT IN SYNCHRONIZED DYNAMIC GEOLOCATION AREAS" (which issued as U.S. Pat. No. 10,631,122 on Apr. 21, 2020), which is a continuation of U.S. patent application Ser. No. 15/843,479, filed Dec. 15, 2017, entitled "SYSTEM AND METHOD OF PROVIDING AUGMENTED REALITY CONTENT IN SYNCHRONIZED DYNAMIC GEOLOCATION AREAS" (which issued as U.S. Pat. No. 10,356,551 on Jul. 16, 2019), which claims the benefit of U.S. Provisional Patent Application Ser. No. 62/435,176, filed Dec. 16, 2016, entitled "SYSTEM AND METHOD OF PROVIDING AUGMENTED REALITY CONTENT IN SYNCHRONIZED DYNAMIC GEOLOCATION AREAS", which are hereby incorporated herein by reference in their entireties.

FIELD OF THE INVENTION

The disclosure relates to systems and methods of creating a synchronized dynamic geolocation area and augmenting a view of a synchronized dynamic geolocation area with content based on one or more display parameters.

BACKGROUND OF THE INVENTION

Interest in augmented reality content has grown at an impressive rate. Typically, current augmented reality systems display content based on a fixed geolocation. Consequently, many current augmented reality systems rely on a user navigating to a fixed geolocation to view the augmented reality content. Other current augmented reality systems display content based not on a geolocation, but instead on image recognition, object recognition, or through the use of a mobile device's accelerometer or gyroscope features. Various limitations exist with respect to displaying augmented reality content based on a fixed geolocation or through the use of image recognition, object recognition, or gyroscope/accelerometer positioning of a mobile device.

These and other problems exist with current augmented reality systems.

SUMMARY OF THE INVENTION

The invention addressing these and other drawbacks relates to a system and method of creating a synchronized dynamic geolocation area and augmenting a view of the synchronized dynamic geolocation area with content based on one or more display parameters. Generally speaking, the system may include may include a computer system having one or more physical processors programmed to generate a dynamic user-defined geolocation area, associate content with the geolocation area, synchronize the geolocation area with a recipient user device, and display content on the recipient user device based on the relative position of the recipient user device with the geolocation area.

The system and method provided herein may facilitate the creation of user-defined geolocation areas based on the geolocation of an initiating user. A geolocation area (or geofence area) is a geographic region or area defined with a boundary line. User-defined geolocation areas may be static or dynamic, and may be based on a remote geolocation, object, user, and/or device. For example, a dynamic geolocation area based on the geolocation of an initiating user may move from a first geolocation to a second geolocation as a user device associated with the initiating user moves from the first geolocation to the second geolocation.

The system and method provided herein may facilitate the association of virtual content with a geolocation area. Content may be selected or uploaded by a user and associated with a geolocation area. Content may be associated with user- and/or system-defined display parameters that specify who may see the content, where the content may be displayed, when the content may be displayed, and/or how the content may be displayed. Content may be modified before or after the content is associated with a geolocation area.

The system and method provided herein may be configured to synchronize a recipient user device with the geolocation area, the associated content, and/or the initiating user device. The recipient user device may be synchronized with the geolocation area, the associated content, and/or the initiating user device based on information obtained from one or more sensors associated with the recipient user device and/or the initiating user device. For example, the one or more sensors may include and/or relate to a gyroscope, an accelerometer, a data reading, a barometric sensor, a GPS component, a GLONASS component, an AGPS component, an internal clock, Bluetooth® low energy (BLE) for triangulation, and/or other sensors or devices able to assist in determining the relative position and/or location of a recipient user device or an initiating user device. The system may provide chat functionality to synchronized or connected user devices.

The system and method provided herein may cause the content to be displayed on the recipient user device based on the relative position of the recipient user device with the geolocation area, the associated content, and/or the initiating user device. The system may cause the content to be displayed on the initiating user device. The content may displayed in real-time and based on user- and/or system-defined display parameters associated with the content. The content may be used to augment a view of the geolocation area displayed in real-time via the recipient user device, the initiating user device, a wearable device associated with either the recipient user or the initiating user, and/or other devices used to display a real-time video feed of the geolocation area.

Some or all of the processing performed by the system may be performed at a user device configured to display a view of a geolocation area augmented with content associated with the geolocation area and/or at another device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
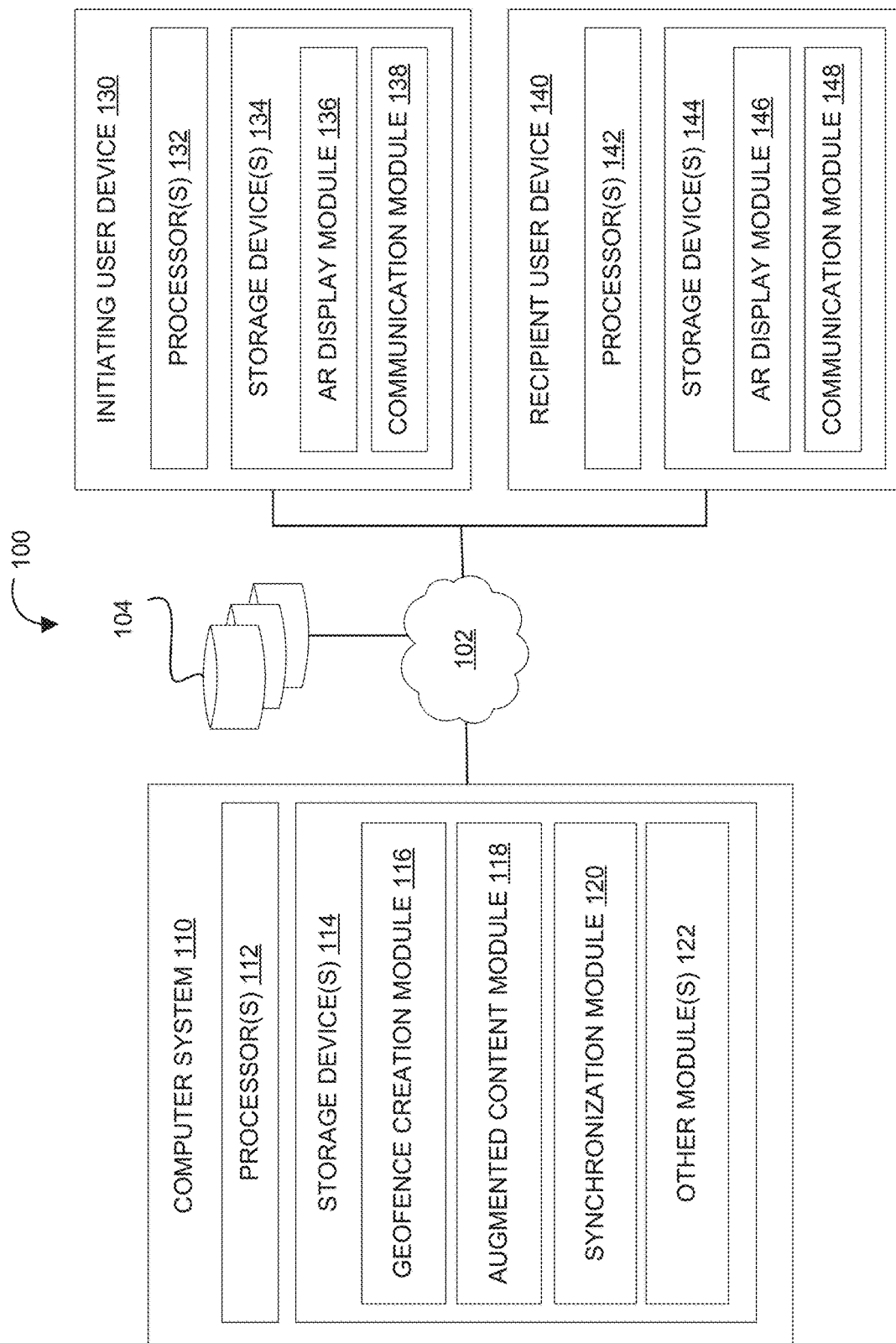
FIG. 1 illustrates a system of creating a synchronized dynamic geolocation area and augmenting a view of the synchronized dynamic geolocation area with content based on one or more display parameters, according to an implementation of the invention.

The invention described herein relates to a system and method for creating a synchronized dynamic geolocation area and augmenting a view of the synchronized dynamic geolocation area with content based on one or more display parameters. It will be appreciated, however, by those having skill in the art that the implementations may be practiced without these specific details or with an equivalent arrangement. In other instances, well-known structures and devices are shown in block diagram form in order to avoid unnecessarily obscuring the implementations of the invention.
Exemplary System Architecture FIG. 1 illustrates a system 100 of creating a synchronized dynamic geolocation area and augmenting a view of the synchronized dynamic geolocation area with content based on one or more display parameters, according to an implementation of the invention. In one implementation, system 100 may include a database 104, a computer system 110, an initiating user device 130, a recipient user device 140, and/or other components.

Computer system 110 may be configured as a server (e.g., having one or more server blades, processors, etc.), a gaming console, a handheld gaming device, a personal computer (e.g., a desktop computer, a laptop computer, etc.), a smartphone, a tablet computing device, a wearable device, and/or other device that can be programmed to create a synchronized dynamic geolocation area and augment the synchronized dynamic geolocation area with content based on one or more display parameters.

Computer system 110 may include one or more processor(s) 112 (also interchangeably referred to herein as processor(s) 112 for convenience), one or more storage device(s) 114, and/or other components. The one or more processor(s) 112 may be configured to perform some or all of a functionality of a plurality of modules, which may be stored in the one or more storage device(s) 114. For example, the one or more processors 112 may be programmed by a geofence creation module 116, an augmented content module 118, a synchronization module 120, and/or other modules 122. As used herein, for convenience, the various modules will be described as performing an operation, when, in fact, various instructions associated with the various modules program the processors 112 (and therefore computer system 110) to perform the operation.

Geofence creation module 116 may be configured to generate a user-defined geolocation area (or geofence) based on an indication of a local or remote geolocation. For example, geofence creation module 116 may generate a geolocation area based on the local geolocation of the initiating user or based on a remote geolocation, a remote object, a remote user, and/or a remote device. In various implementations, geofence creation module 116 may be configured to generate a user-defined geolocation area based on one or more user- or system-defined geofence parameters. For example, the one or more geofence parameters may include an indication to create a static or dynamic geolocation area, one or more geofence size parameters, and/or one or more geofence shape parameters.

In various implementations, the one or more geofence parameters may include an indication to create a static or dynamic geolocation area. Geofence creation module 116 may be configured to generate a static geolocation area or a dynamic geolocation area based on the one or more geofence parameters. A static geolocation area may be based on a fixed geolocation. A dynamic geolocation area may be based on a user, user device, vehicle, and/or vehicle device and may change over time. For example, a dynamic geolocation area based on the geolocation of an initiating user may move from a first geolocation to a second geolocation as a user device associated with the initiating user moves from the first geolocation to the second geolocation.

In various implementations, the one or more geofence parameters may include one or more geofence size parameters. Geofence creation module 116 may be configured to generate a geolocation area based on the one or more geofence size parameters. The one or more geofence size parameters may indicate a size of a geolocation area to be generated by geofence creation module 116. For example, the one or more geofence size parameters may include an indication of a radius and/or dimensions of a geolocation area. In some implementations, the one or more geofence size parameters may include an indication to generate a 3-D or multi-dimensional geolocation area.

In various implementations, the one or more geofence parameters may include one or more geofence shape parameters. Geofence creation module 116 may be configured to generate a geolocation area based on the one or more geofence shape parameters. The one or more geofence shape parameters may indicate a shape of a geolocation area to be generated by geofence creation module 116. For example, the one or more geofence shape parameters may include an indication to generate a circular geolocation area, a square geolocation area, a polygonal geolocation area, and/or a geolocation area based on one or more other shapes. In some implementations, the one or more geofence shape parameters may include an indication of a unique polygon received from an initiating user. Geofence creation module 116 may be configured to generate a geolocation area in the shape of a unique polygon based on the indication from an initiating user. In some implementations, the one or more geofence shape parameters may include an indication of a freeform shape received from an initiating user. Geofence creation module 116 may be configured to generate a geolocation area in the shape of a freeform shape based on the indication from an initiating user.

Augmented content module 118 may be configured to associate virtual content with a geolocation area. Augmented content module 118 may access geolocation areas generated by geofence creation module 116. In various implementations, content may be in the form of an emoji, textual content, an image, audio-visual content, an interactive link, an advertisement or promotion, and/or other forms of content. Content may be two-dimensional or three-dimensional. In various implementations, augmented content module 118 may receive uploaded content from initiating user device 130. In some implementations, uploaded content may be stored in database 104. In various implementations, augmented content module 118 may receive an indication of content selected by an initiating user, wherein the content selected is to be associated with a geolocation area. Responsive to the indication of a content selection by an initiating user, augmented content module 118 may retrieve the content from database 104. Augmented content module 118 may be configured to associate the uploaded content and/or selected content with a geolocation area.

In various implementations, augmented content module 118 may associate one or more user- and/or system-defined display parameters with content prior to, or after, the content is associated with a geolocation area. For example, the one or more display parameters may include a distance parameter, a content accessibility parameter, a content placement parameter, a temporal display parameter, a variable display parameter, and/or one or more other display parameters.

In various implementations, the one or more display parameters may include a distance parameter, which may include an indication of the distance from a location associated with a geolocation area at which content is to be displayed. For example, a display parameter may indicate that content is to be displayed in an augmented view of a geolocation area on a recipient user device when a recipient user device is within a specified distance from a location associated with a geolocation area. In various implementations, the specified distance may be an absolute distance from a fixed location, a relative distance from a dynamic location, and/or a range of distances from a location associated with the geolocation area. For example, the distance parameter may indicate that certain content may be displayed in an augmented view of a geolocation area when a recipient user device is between 50 yards and 100 yards from a location associated with a geolocation area.

In various implementations, multiple content items may be associated with a geolocation area, wherein the multiple content items are each associated with different user- and/or system-defined display parameters. For example, an initiating user device associated with initiating user device 130 may associate a first content item with a first distance parameter that specifies a range of 51 yards to 100 yards and a second content item with a second distance parameter that specifies a range of 25 yards to 50 yards. As a recipient user device moves to within 100 yards of a location associated with a geolocation area, the first content item may be displayed in an augmented view of the geolocation area. As the recipient user devices move to within 50 yards of the same geolocation area, the second content item may be displayed in the augmented view of the geolocation area. The multiple content items may be of the same or a different type.

In various implementations, the one or more display parameters may include a content accessibility display parameter, which may include an indication of whether content is public or private. For example, public content may be accessible by any user based on the relative position of the user and the geolocation area. Accessibility may include interacting with the content, viewing the content, and/or editing the content. However, the accessibility of private content may be limited to one or more specific users or one or more specific groups defined by an initiating user or defined automatically by the system.

In various implementations, the one or more display parameters may include a content placement parameter, which may include an indication of where content is to be displayed in a geolocation area. In some implementations, a content placement parameter may include an indication of where on a display on recipient user device 140 content is to appear within a geolocation area. For example, a content placement parameter may indicate a position on an x-y-z axis within a geolocation area at which content is to be displayed. In some implementations, a content placement parameter may indicate a position relative to a geolocation, object, user, and/or device at which content is to be displayed. For example, a content placement parameter may specify a location within a dynamic geolocation area based on the geolocation of an initiating user, wherein the location may be to the left, to the right, or above the initiating user within a display on recipient user device 140.

In various implementations, the one or more display parameters may include a temporal display parameter, which may include an indication of when content is to be displayed in a geolocation area. In some implementations, a temporal display parameter may include an indication that content is able to be displayed at a certain time, during a certain time period, before a certain time, after a certain time, or for a specified duration of time. For example, a temporal display parameter may indicate that content is able to be displayed until 8 PM. In the preceding example, the content may not be displayed to the recipient user on recipient user device 140 after 8 PM. As another example, a temporal display parameter may indicate that content may be displayed for a maximum duration of 30 seconds, either consecutively or total. In the foregoing example, the content may be removed from the display of recipient user device 140 after the content has been displayed on recipient user device 140 for a duration of 30 seconds.

In various implementations, the one or more display parameters may include a variable display parameter, which may include an indication of how content is to be displayed in a geolocation area. In some implementations, a variable display parameter may include an indication that content is to face a specified direction, spin, or rotate when displayed to a recipient user via recipient user device 140. For example, a variable display parameter may include an indication that content is to rotate to face a recipient user when displayed to a recipient user via recipient user device 140.

Augmented content module 118 may be configured to facilitate the alteration of content and/or one or more display parameters prior to, or after, content is associated with a geolocation area. For example, an initiating user may select a smiling face emoji to associate with a dynamic geolocation area based on the geolocation of the initiating user. After associating the smiling face emoji with the dynamic geolocation area, augmented content module 118 may, responsive to an indication from an initiating user, remove the smiling face emoji and associate a frowning face emoji with the dynamic geolocation area.

In various implementations, augmented content module 118 may be configured to associate one or more triggering conditions with content and/or a geolocation area. A triggering condition may indicate a threshold at which augmented content may change in appearance, be replaced by other content, or removed from the augmented view based on information associated with one or more synchronized user devices. Such triggering conditions may include entry within a geolocation area by a user device, movement of a user device to within a predefined distance from of a geolocation area, movement of a user device to outside a predefined distance from of a geolocation area, an indication that a particular user device has logged in to or logged out of system 100, and/or an indication that information related to one or more of the foregoing display parameters has changed.

Synchronization module 120 may be configured to synchronize recipient user device 140 with a geolocation area, with content associated with a geolocation area, and/or with initiating user device 130. For example, synchronization module 116 may be configured to synchronize recipient user device 140 with a geolocation area, content associated with a geolocation area, and/or initiating user device 130 utilizing Bluetooth® low energy (BLE) for triangulation and/or information obtained from and/or related to a gyroscope, an accelerometer, a barometric pressure sensor, a GPS component, a GLONASS component, a AGPS component, an internal clock, and/or other information related to one or more sensors or devices of recipient user device 140 and/or initiating user device 130. In various implementations, recipient user device 140 may be synchronized with coordinates for the content associated with the geolocation area.

Initiating user device 130 may be configured as a server (e.g., having one or more server blades, processors, etc.), a gaming console, a handheld gaming device, a personal computer (e.g., a desktop computer, a laptop computer, etc.), a smartphone, a tablet computing device, a wearable device, and/or other device that can be programmed to define a geolocation area to be created, provide one or more geofence parameters, provide content to be associated with a geolocation area, provide one or more display parameters for content to be associated with a geolocation area, and/or display a view (i.e., a real-time video feed) of a geolocation area augmented with content associated with the geolocation area. Initiating user device 130 may include one or more sensors or devices used to synchronize the initiating user device 130 with recipient user device 140, a geolocation area, and/or content associated with a geolocation area and determine whether to display a view of a geolocation area augmented with content associated with the geolocation area. For example, the one or more sensors or devices may include and/or relate to a gyroscope, an accelerometer, a barometric pressure sensor, a GPS component, a GLONASS component, an AGPS component, an internal clock, and/or other sensors or devices able to assist in determining the relative position and/or location of a recipient user device or an initiating user device.

Initiating user device 130 may include one or more processor(s) 132 (also interchangeably referred to herein as processor(s) 132 for convenience), one or more storage device(s) 134, and/or other components. The one or more processor(s) 132 may be configured to perform some or all of a functionality of a plurality of modules, which may be stored in the one or more storage device(s) 134. For example, the one or more processors 132 may be programmed by a AR display module 136, a communication module 138, and/or other modules. As used herein, for convenience, the various modules will be described as performing an operation, when, in fact, various instructions associated with the various modules program the processors 132 (and therefore initiating user device 130) to perform the operation. In various implementations, the one or more processor(s) 132 may be configured to perform one or all of the operations described with respect to computer system 110. For example, the one or more processor(s) 132 may be configured to perform one or all of the operations described with respect to geofence creation module 116, augmented content module 118, synchronization module 120, and/or other modules 122.

AR display module 136 may be configured to determine whether to display a view of a geolocation area augmented with content associated with the geolocation area and/or generate user interfaces that enable viewing and interaction with real-time augmented views of geolocation areas. AR display module 136 may perform any and all aspects of the AR display module 146 described below.

Communication module 138 may be configured to communicate information related to a geolocation area and/or content associated with a geolocation area between computer system 110, initiating user device 130, recipient user device 140, and/or other devices. In some implementations, communication module 138 may be configured to communicate messages between initiating user device 130, recipient user device 140, and/or other devices.

Recipient user device 140 may be configured as a server (e.g., having one or more server blades, processors, etc.), a gaming console, a handheld gaming device, a personal computer (e.g., a desktop computer, a laptop computer, etc.), a smartphone, a tablet computing device, a wearable device, and/or other device that can be configured to utilize location-based services, such as GPS and geolocation, and display a view (i.e., a real-time video feed) of a geolocation area augmented with content associated with the geolocation area. Recipient user device 140 may include one or more sensors or devices used to synchronize the recipient user device 140 with initiating user device 130, a geolocation area, and/or content associated with a geolocation area and determine whether to display a view of a geolocation area augmented with content associated with the geolocation area. For example, the one or more sensors or devices may include and/or relate to a gyroscope, an accelerometer, a barometric pressure sensor, a GPS component, a GLONASS component, an AGPS component, an internal clock, and/or other sensors or devices able to assist in determining the relative position and/or location of a recipient user device or an initiating user device.

Recipient user device 140 may include one or more processor(s) 142 (also interchangeably referred to herein as processor(s) 142 for convenience), one or more storage device(s) 144, and/or other components. The one or more processor(s) 142 may be configured to perform some or all of a functionality of a plurality of modules, which may be stored in the one or more storage device(s) 144. For example, the one or more processor(s) 142 may be programmed by a AR display module 146, a communication module 148, and/or other modules. As used herein, for convenience, the various modules will be described as performing an operation, when, in fact, various instructions associated with the various modules program the processors 142 (and therefore recipient user device 140) to perform the operation. In various implementations, the one or more processor(s) 142 may be configured to perform one or all of the operations described with respect to computer system 110. For example, the one or more processor(s) 142 may be configured to perform one or all of the operations described with respect to geofence creation module 116, augmented content module 118, synchronization module 120, and/or other modules 122.

AR display module 146 may be configured to determine whether to display a view of a geolocation area augmented with content associated with the geolocation area and/or generate user interfaces that enable viewing and interaction with real-time augmented views of geolocation areas. AR display module 146 may be configured to determine whether to display a view of a geolocation area augmented with content based on one or more criteria associated with the geolocation area and/or display parameters associated with the content. For example, based on the relative position of synchronized recipient user device 140 with a geolocation area, AR display module 146 may enable content associated with the geolocation area to be displayed via initiating user device 130 and/or synchronized recipient user device 140. For example, AR display module 146 may be configured to augment a view of a geolocation area with content associated with the geolocation area in a camera application on initiating user device 130 and/or recipient user device 140 based on one or more display parameters that are associated with the content. Based on a determination that a view of a geolocation area augmented with content associated with the geolocation area is accessible due to the relative position of recipient user device 140 with the geolocation area, AR display module 146 may prompt the recipient user to access a camera application (and/or other application) on recipient user device 140 to display the view of the augmented geolocation area. For example, AR display module 146 may prompt the recipient user via an indication on the display of recipient user device 140, a vibration of recipient user device 140, and/or a sound generated by recipient user device 140.

AR display module 146 may be configured to provide directions and/or indicators via a camera application (and/or other application) on recipient user device 140 to indicate the direction the recipient user must travel to view the augmented geolocation area. For example, AR display module 146 may display arrows via a camera application (and/or other application) on recipient user device 140 to indicate the direction the recipient user must travel to view the augmented geolocation area.

AR display module 146 may be configured to enable interaction with the augmented content. For example, content may be selectable, such that when selected via a display on a recipient user device 140, recipient user device may play a video, play a sound recording, navigate to a webpage, access a different application, and/or reveal a message intended for the recipient user.

AR display module 146 may be configured to display icons indicating a position of one or more users of system 100 on one or more user devices associated with the one or more users of system 100. For example, AR display module 146 may be configured display on initiating user device 130 and/or recipient user device 140 an icon indicating a location of one or more users associated with initiating user device 130 and/or recipient user device 140. AR display module 146 may be configured to provide, to the one or more users via an application on a user device associated with the one or more users, directions to one or more other users of system 100. In various implementations, AR display module 146 may display directions to travel to the one or more other users. In some implementations, AR display module 146 may provide an indication to one or more users associated with a user device that one or more other users are located within a predefined proximity.

Communication module 148 may be configured to communicate information related to a geolocation area and/or content associated with a geolocation area between computer system 110, initiating user device 130, recipient user device 140, and/or other devices. In some implementations, communication module 138 may be configured to communicate messages between initiating user device 130, recipient user device 140, and/or other devices.

Initiating user device 130 and/or recipient user device 140 may be associated with one or more users identified by system 100. Various techniques may allow identification of users (or at least corresponding end user devices, accounts, etc., associated with users). In various implementations, users may register with system 100 during an initial interaction with system 100. For example, users may register with system 100 by providing user account information associated with the user. User account data may include usernames, passwords, first names, last names, email addresses, phone numbers, etc. System 100 may store user account data associated with one or more users registered with the system for later retrieval and/or identification of the one or more users. For example, user account data stored by system 100 may be used to identify a user who logs-in to system 100 via an application on initiating user device 130 and/or recipient user device 140.

Although illustrated in FIG. 1 as a single component, computer system 110, initiating user device 130, and recipient user device 140 may each include a plurality of individual components (e.g., computer devices) each programmed with at least some of the functions described herein. In this manner, some components of computer system 110, initiating user device 130, and/or recipient user device 140 may perform some functions while other components may perform other functions, as would be appreciated. The processor(s) 112, processor(s) 132, and/or processor(s) 142 may each include one or more physical processors that are programmed by computer program instructions. The various instructions described herein are exemplary only. Other configurations and numbers of instructions may be used, so long as the processor(s) 112, processor(s) 132, and/or processor(s) 142 are programmed to perform the functions described herein.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112, processor(s) 132, and/or processor(s) 142 may be programmed by one or more additional instructions that may perform some or all of the functionality attributed herein to one of the instructions.

The various instructions described herein may be stored in one or more storage device(s) 114, one or more storage device(s) 134, and/or one or more storage device(s) 144, which may comprise random access memory (RAM), read only memory (ROM), and/or other memory. The storage device may store the computer program instructions (e.g., the aforementioned instructions) to be executed by processor(s) 112, processor(s) 132, and/or processor(s) 142, as well as data that may be manipulated by processor(s) 112, processor(s) 132, and/or processor(s) 142. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various databases 104 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Exemplary Flowchart of Process

Figure 2:
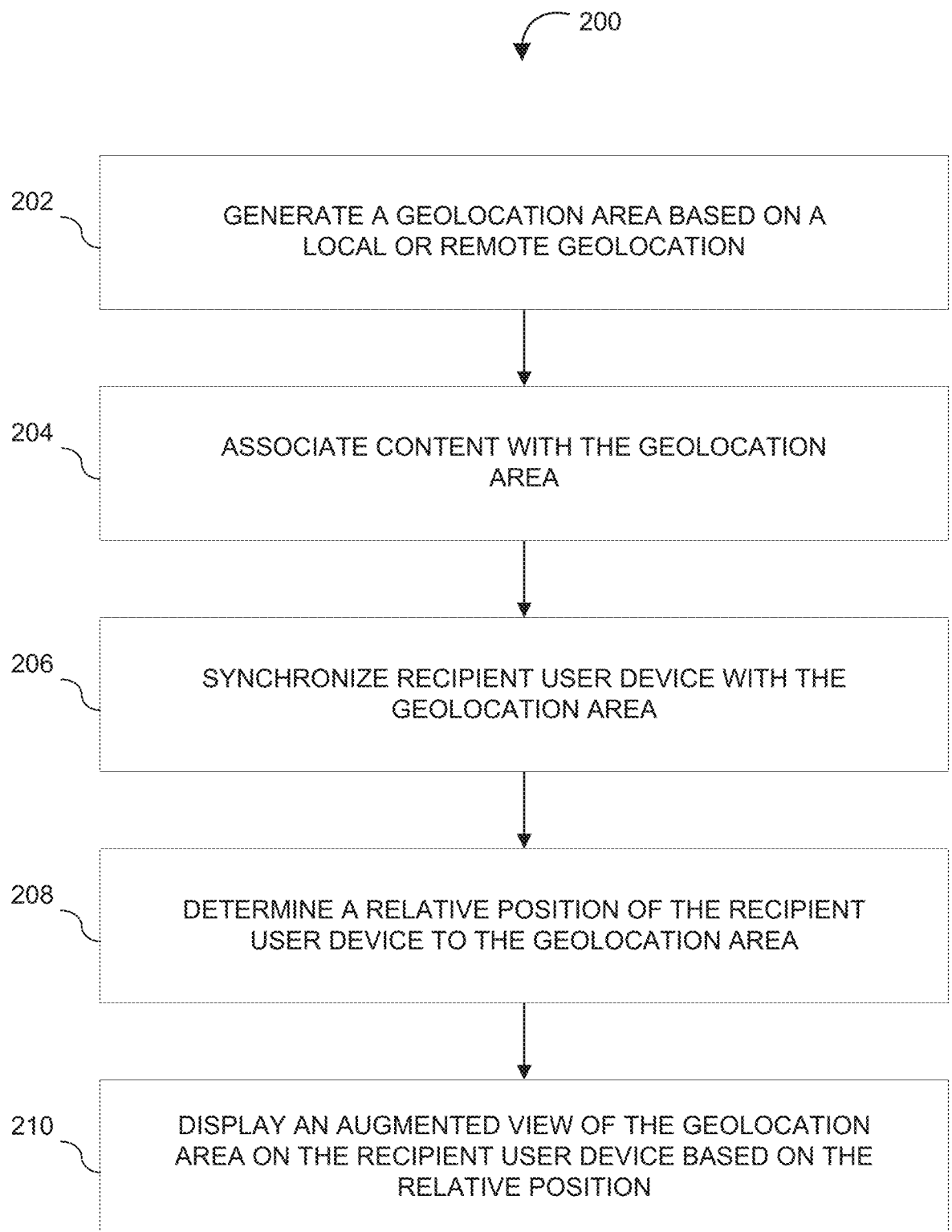
FIG. 2 depicts a flowchart of a process of creating a synchronized dynamic geolocation area and augmenting a view of the synchronized dynamic geolocation area with content based on one or more display parameters, according to an implementation of the invention.

FIG. 2 depicts a process 200 of creating a synchronized dynamic geolocation area and augmenting a view of the synchronized dynamic geolocation area with content based on one or more display parameters, according to an implementation of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, process 200 may include generating a geolocation area based on a local or remote geolocation. A geolocation area (or geofence area) is a geographic region or area defined with a boundary line. Geolocation areas may be static or dynamic and may be based on a user-defined or system-defined geolocation. For example, an initiating user may register and/or log-in to system 100 via an application on initiating user device 130 and specify a local or remote geolocation for which to generate a geolocation area. In an exemplary implementation, a dynamic geolocation area may be generated based on the current location of an initiating user. For example, a current location of an initiating user may be determined based on location information obtained from a user device associated with the initiating user. The geolocation area may be dynamic in that the geolocation area moves from a first geolocation to a second geolocation as the user device associated with the initiating user moves from the first geolocation to the second geolocation. Location information from the initiating user device may be monitored continuously or periodically to determine the current location of the initiating user. In various implementations, the geolocation area may be generated based on one or more user- or system-defined geofence parameters.

In an operation 204, process 200 may include associating content to be provided in an augmented view of the geolocation area with the geolocation area. The content may be uploaded by an initiating user, selected by an initiating user from a database of content, or otherwise provided to the system by the initiating user. For example, the content may be in the form of an emoji, textual content, an image, audio-visual content, an interactive link, an advertisement or promotion, and/or other forms of content.

In an operation 206, process 200 may include obtaining one or more user-defined display parameters for the associated content. For example, the one or more user-defined display parameters may specify who may see the content, where the content may be displayed, when the content may be displayed, and/or how the content may be displayed.

In an operation 208, process 200 may include synchronizing a recipient user device with the dynamic geolocation area. A recipient user device may be synchronized utilizing Bluetooth® low energy (BLE) for triangulation and/or information related to a gyroscope, an accelerometer, a barometric pressure sensor, a GPS device, a GLONASS component, an AGPS component, an internal clock, and/or other information related to one or more sensors or devices of recipient user device 140 and/or initiating user device 130 able to assist in determining the relative position and/or location of a recipient user device or an initiating user device. In the exemplary implementation in which the dynamic geolocation area is generated based on the current location of an initiating user, the recipient user device may be synchronized with the initiating user device.

In an operation 210, process 200 may include displaying an augmented view of the geolocation area on the recipient user device based on the one or more display parameters and the relative position of the synchronized recipient user device to the geolocation area. Based on a determination that a view of a geolocation area augmented with the content associated with the geolocation area is accessible due to the relative position of the recipient user device with the geolocation area, the recipient user device may prompt the recipient user to access a camera application (and/or other application) on the recipient user device to display the view of the augmented geolocation area. As the relative position of the synchronized recipient user device changes, the augmented view of the geolocation with the associated content may change. The augmented view of the geolocation area with the associated content may be displayed based on the one or more user-defined display parameters. The one or more display parameters may include rules or criteria indicating how the content may change as the relative position of the recipient user device changes. If the augmented view of the geolocation area is not yet accessible due to the relative position of the recipient user device with the geolocation area, the recipient user device may provide directions and/or indicators via a camera application (and/or other application) on the recipient user device to indicate the direction the recipient user must travel to view the augmented geolocation area. The recipient user device may interact with the augmented content. For example, the content may be selectable, such that when selected via a display on the recipient user device, the recipient user device may play a video, play a sound recording, navigate to a webpage, access a different application, and/or reveal a message intended for the recipient user.

Figure 3B:
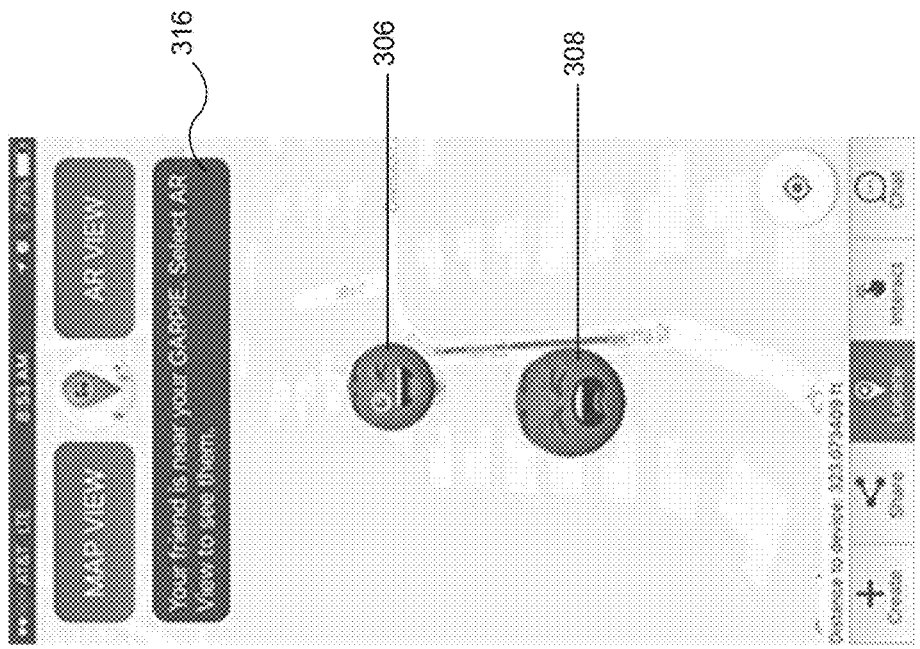
FIG. 3B illustrates an exemplary screenshot of a screen of a mobile application on a device used to display a map view of a geolocation area.
Figure 3A:
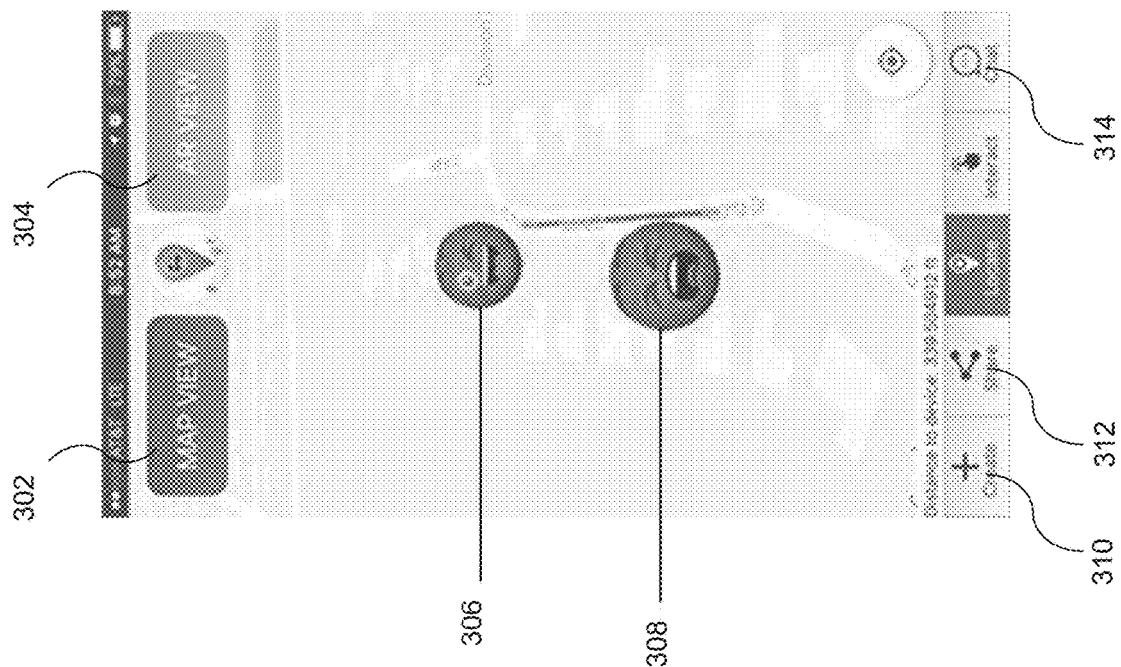
FIG. 3A illustrates an exemplary screenshot of a screen of a mobile application on a device used to display a map view of a geolocation area.
Figure 4C:
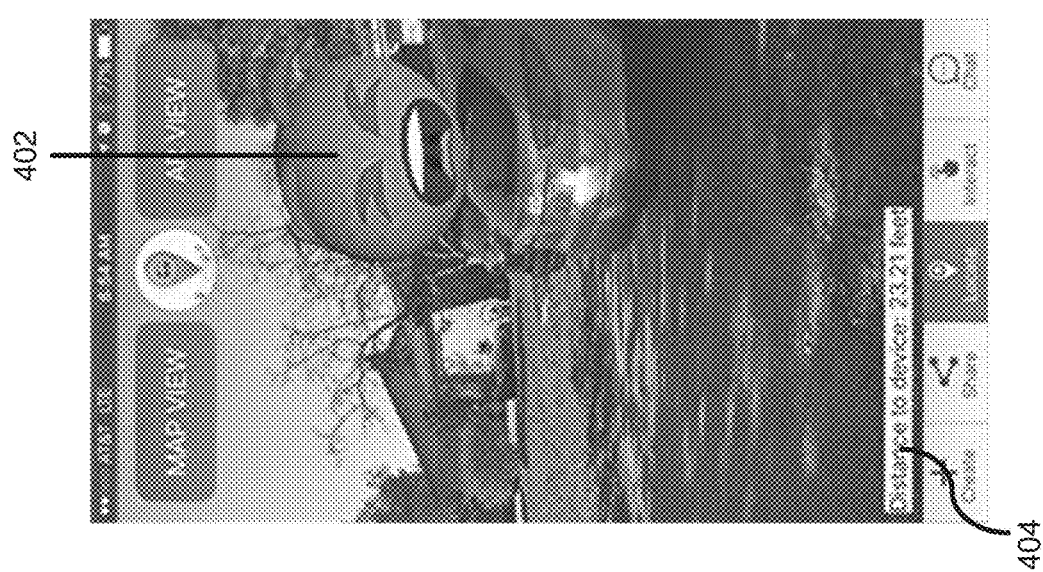
FIG. 4C illustrates an exemplary screenshot of a screen of a mobile application on a device used to display an augmented reality view of a geolocation area.
Figure 4B:
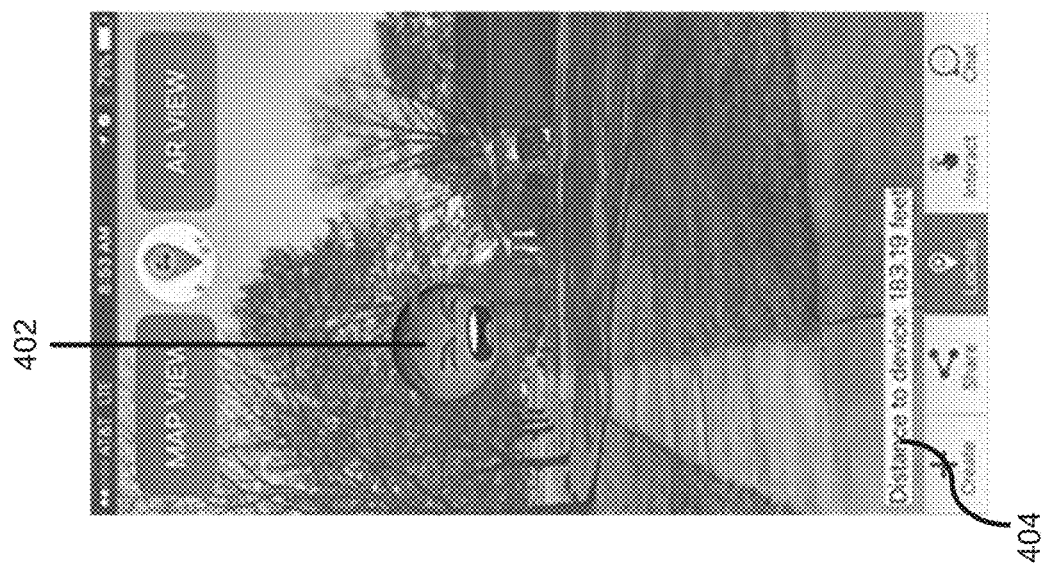
FIG. 4B illustrates an exemplary screenshot of a screen of a mobile application on a device used to display an augmented reality view of a geolocation area.
Figure 4A:
FIG. 4A illustrates an exemplary screenshot of a screen of a mobile application on a device used to display an augmented reality view of a geolocation area.

FIG. 3A illustrates an exemplary screenshot of a screen of a mobile application on initiating user device 130 and/or recipient user device 140 used to display a map view of a geolocation area. The screen in FIG. 3A may include a map view button 302, an AR view button 304, an initiating user icon 306, a recipient user icon 308, a create geolocation area button 310, a share geolocation area button 312, and a chat button 314. When selected by a user, the AR view button 304 may navigate to a view of a geolocation area and/or an augmented view of a geolocation area, as depicted in FIGS. 4A-4C. The create geolocation area button 310 may allow a user associated with a user device displaying the screen to create a geolocation area using some or all of the techniques described above with respect to geofence creation module 116 of FIG. 1 and/or operation 202 of FIG. 2. The share geolocation area button 312 may allow a user associated with a user device displaying the screen to share a geolocation area and/or content associated with a geolocation area. The chat button 314 may allow a user associated with a user device displaying the screen to initiate and/or participate in a chat with one or more other users via one or more other user devices.

In various implementations, the screen may display an initiating user icon 306 and a recipient user icon 308 indicating a location of an initiating user (and/or initiating user device 130) and a recipient user (and/or recipient user device 140), respectively. The screen may display directions and/or a route for a user to travel to another user for which an icon is displayed on the screen. As a user moves, the icon associated with the user moves and the relative position of the user with one or more other users for which an icon is displayed on the screen may change, which may be depicted on the screen.

FIG. 3B illustrates an exemplary screenshot of a screen of a mobile application on initiating user device 130 and/or recipient user device 140 used to display a map view of a geolocation area. The screen in FIG. 3B may include some or all of the features described with respect to the screen in FIG. 3A. Alternatively or additionally, the screen in FIG. 3B may include a proximity notification 316 indicating that one or more other users are located with a proximity of the user associated with the user device displaying the screen.

FIG. 4A illustrates an exemplary screenshot of a screen of a mobile application on initiating user device 130 and/or recipient user device 140 used to display an augmented reality view of a geolocation area. In various implementations, the augmented reality view of a geolocation area on the screen depicted in FIG. 4A may include content associated with the geolocation area based on the relative position of the user device displaying the screen and the geolocation area. For example, the augmented reality view of the geolocation area in FIG. 4A may include a user icon 402. The user icon 402 may indicate a position of a user associated with system 100. For example, user icon 402 may indicate a position of an initiating user associated with initiating user device 130. The user icon 402 may be in the form of an emoji and/or other types of content, as described further above. The screen in FIG. 4A may include a distance indicator 404 indicating a distance of the user device to the location associated with the content. For example, the distance indicator 404 in FIG. 4A indicates that the distance of the user device displaying the screen in FIG. 4A from the location associated with the content (i.e., user icon 402) is 323.07 feet. Alternatively or additionally, the screen in FIG. 4A may include some or all of the features described with respect to the screen in FIG. 3A.

FIG. 4B illustrates an exemplary screenshot of a screen of a mobile application on initiating user device 130 and/or recipient user device 140 used to display an augmented reality view of a geolocation area. The screen in FIG. 4B may depict a screen of a mobile application on a user device at a time when the user device displaying the screen in FIG. 4B is closer to the location associated with the content (i.e., user icon 402) than the time at which the screen in FIG. 4A is depicted on the user device. For example, the distance indicator 404 in FIG. 4B indicates that the distance of the user device displaying the screen in FIG. 4B from the location associated with the content (i.e., user icon 402) is 189.19 feet. In various implementations, content displayed in an augmented view on a user device (i.e., user icon 402) may be depicted differently based on the relative position (e.g., distance) of the user device to the geolocation area at the time when the user device is displaying the screen in FIG. 4B and when the user device is displaying the screen in FIG. 4A. For example, user icon 402 may appear larger as the user device moves closer to the location associated with the user icon 402. Alternatively or additionally, the content displayed in an augmented view on a user device may change from one type of content to another based on the relative position of the user device to the geolocation area. The screen in FIG. 4B may include some or all of the features described with respect to the screen in FIG. 3A.

FIG. 4C illustrates an exemplary screenshot of a screen of a mobile application on initiating user device 130 and/or recipient user device 140 used to display an augmented reality view of a geolocation area. The screen in FIG. 4C may depict a screen of a mobile application on a user device at a time when the user device displaying the screen in FIG. 4C is closer to the location associated with the content (i.e., user icon 402) than either of the times at which the screens in FIG. 4A or FIG. 4B are depicted on the user device. For example, the distance indicator 404 in FIG. 4C indicates that the distance of the user device displaying the screen in FIG. 4C from the location associated with the content (i.e., user icon 402) is 23.21 feet. The screen in FIG. 4C may include some or all of the features described with respect to the screen in FIG. 3A.

Figure 5:
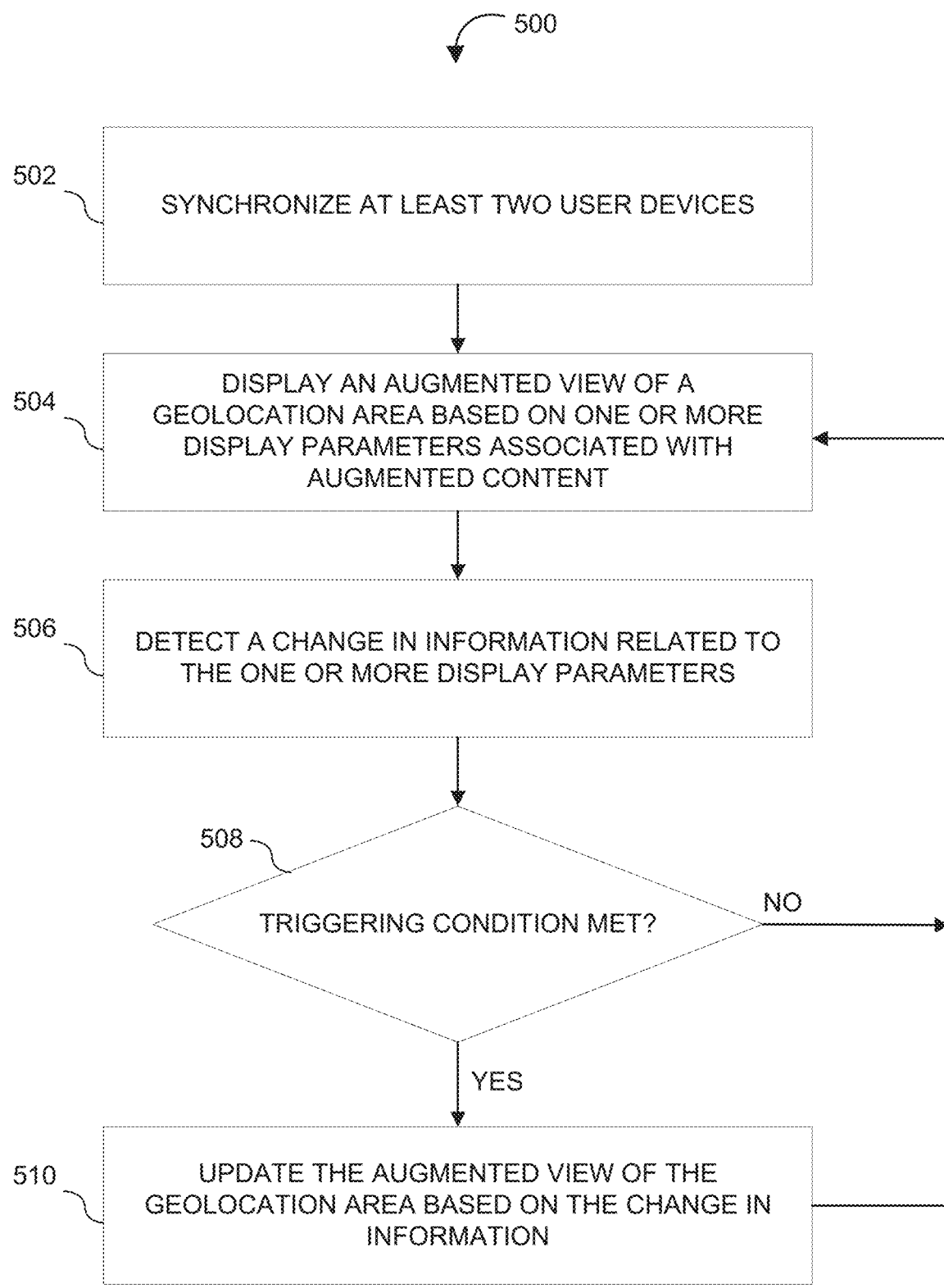
FIG. 5 depicts a flowchart of a process of updating an augmented view displayed on one or more synchronized user devices based on changes in information related to one or more display parameters, according to an implementation of the invention.

FIG. 5 depicts a flowchart of a process 500 of updating an augmented view displayed on one or more synchronized user devices based on changes in information related to one or more display parameters, according to an implementation of the invention. The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, process 500 may include synchronizing at least two user devices. For example, at least two user devices may be synchronized using some or all of the techniques described above with respect to synchronization module 120 of FIG. 1 and/or operation 206 of FIG. 2.

In an operation 504, process 500 may include displaying an augmented view of a geolocation area via a user device based on one or more display parameters associated with content augmented on the view of the geolocation area. For example, an augmented view of a geolocation area may be displayed using some or all of the techniques described above with respect to AR display module 146 of FIG. 1 and/or operation 210 of FIG. 2. The one or more display parameters may include some or all of the display parameters described above with respect to augmented content module 118 of FIG. 1.

In an operation 506, process 500 may include detecting a change in information related to the one or more display parameters. As described above with respect to augmented content module 118 of FIG. 1, the one or more display parameters may include a distance parameter, a content accessibility parameter, a content placement parameter, a temporal display parameter, a variable display parameter, and/or one or more other display parameters. The information related to the one or more display parameters may include information relevant to displaying content based on the one or more display parameters. For example, the information may indicate that a user device has moved within a specified distance of a location associated with a geolocation area, as specified by a distance parameter associated with content augmented on the view of the geolocation area. For example, the information may indicate that a specified time has elapsed related to the augmented content, wherein the specified time is specified by a temporal display parameter associated with content augmented on the view of the geolocation area.

In an operation 508, process 500 may include determining whether a triggering condition associated with the information related to the one or more display parameters has been met. As described above with respect to augmented content module 118 of FIG. 1, a triggering condition may indicate a threshold at which augmented content may change in appearance, be replaced by other content, or removed from the augmented view based on information associated with one or more synchronized user devices. For example, a triggering condition may indicate that when a user device moves within 50 yards of a location associated with a geolocation area, augmented content may change from a first content item to a second content item. As another example, a triggering condition may indicate that when a specified time has elapsed related to the augmented content, the augmented content is removed from the augmented view of the geolocation area. At operation 508, process 500 may determine whether the detected change in information results in the information satisfying one or more triggering conditions related to the one or more display parameters associated with the augmented content.

If no triggering condition is satisfied by the information as a result of the detected change in information, the augmented view of the geolocation area displayed via the user device may continue to be displayed. If a triggering condition is satisfied by the information as a result of the detected change in information, operation 510 of process 500 may include updating the augmented view of the geolocation area based on the change in information. For example, if it is determined that the information satisfies a triggering condition that indicates that the augmented content is to change when a user device moves within 50 yards of a location associated with a geolocation area, the augmented view of the geolocation area may be updated to remove a first content item from the augmented view and include a second content item in the augmented view. As another example, if it is determined that the information satisfies a triggering condition that indicates that the augmented content is to be removed from the augmented view of the geolocation area when a specified time has elapsed, the augmented view of the geolocation area may be updated to remove the augmented content.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for augmenting a view of a geographic area with content based on a distance between two user devices, the system comprising:
   one or more physical processors programmed with computer program instructions that, when executed by the one or more physical processors, cause the one or more physical processors to perform operations comprising:
   obtaining first location information of a first user device associated with a first user, the first location information indicating a geographic location of the first user device;
   obtaining second location information of a second user device associated with a second user, the second location information indicating a location of the second user device;

determining a distance between the geographic location of the first user device and the geographic location of the second user device;

selecting a content from multiple contents based on the determined distance, wherein the multiple contents appear to have different sizes, and wherein the selected content is a first content and the determined distance is a first distance, further comprising:

determining a second distance between the first user device and the second user device; and selecting a second content from the multiple contents based on the determined second distance, comprising:

selecting the second content to be larger than the first content when the second distance is less than the first distance, and selecting the second content to be smaller than the first content when the second distance is greater than the first distance; and causing an augmented view of the geographic location of the first user device to be displayed on the second user device, the augmented view comprising a view of the geolocation area augmented with the selected content, wherein the content appears in the augmented view at the geographic location of the first user device.

2. The system of claim 1, wherein:
the multiple contents are of different types.

3. The system of claim 1, wherein:
the multiple contents are emojis.

4. The system of claim 1, wherein:
the augmented view comprises a distance indicator that indicates the determined distance.

5. The system of claim 1, wherein the operations further comprise:

obtaining the first location information of the first user device in real-time.

6. A non-transitory machine-readable storage medium encoded with instructions executable by one or more physical processors to perform operations for augmenting a view of a geographic area with content based on a distance between two user devices, the operations comprising:

obtaining first location information of a first user device associated with a first user, the first location information indicating a geographic location of the first user device;

obtaining second location information of a second user device associated with a second user, the second location information indicating a location of the second user device;

determining a distance between the geographic location of the first user device and the geographic location of the second user device;

selecting a content from multiple contents based on the determined distance, wherein the multiple contents appear to have different sizes, and wherein the selected content is a first content and the determined distance is a first distance, further comprising:

determining a second distance between the first user device and the second user device; and selecting a second content from the multiple contents based on the determined second distance, comprising:

selecting the second content to be larger than the first content when the second distance is less than the first distance, and selecting the second content to be smaller than the first content when the second distance is greater than the first distance; and causing an augmented view of the geographic location of the first user device to be displayed on the second user device, the augmented view comprising a view of the geolocation area augmented with the selected content, wherein the content appears in the augmented view at the geographic location of the first user device.

7. The medium of claim 6, wherein:
the multiple contents are of different types.

8. The medium of claim 6, wherein:
the multiple contents are emojis.

9. The medium of claim 6, wherein:
the augmented view comprises a distance indicator that indicates the determined distance.

10. The medium of claim 6, wherein the operations further comprise:

obtaining the first location information of the first user device in real-time.

11. A computer-implemented method for augmenting a view of a geographic area with content based on a distance between two user devices, the method comprising:

obtaining first location information of a first user device associated with a first user, the first location information indicating a geographic location of the first user device;

obtaining second location information of a second user device associated with a second user, the second location information indicating a location of the second user device;

determining a distance between the geographic location of the first user device and the geographic location of the second user device;

selecting a content from multiple contents based on the determined distance, wherein the multiple contents appear to have different sizes, and wherein the selected content is a first content and the determined distance is a first distance, further comprising:

determining a second distance between the first user device and the second user device; and selecting a second content from the multiple contents based on the determined second distance, comprising:

selecting the second content to be larger than the first content when the second distance is less than the first distance, and selecting the second content to be smaller than the first content when the second distance is greater than the first distance; and causing an augmented view of the geographic location of the first user device to be displayed on the second user device, the augmented view comprising a view of the geolocation area augmented with the selected content, wherein the content appears in the augmented view at the geographic location of the first user device.

12. The method of claim 11, wherein:
the multiple contents are of different types.

13. The method of claim 11, wherein:
the multiple contents are emojis.

14. The method of claim 11, wherein:
the augmented view comprises a distance indicator that indicates the determined distance.

* * * * *